United States Patent
Mendo Mateo et al.

(10) Patent No.: US 12,363,007 B2
(45) Date of Patent: Jul. 15, 2025

(54) CELL MULTI-AGENT COORDINATION IN SHARED CONTROL ELEMENTS

(71) Applicant: Telefonaktiebolaget LM Ericsson (publ), Stockholm (SE)

(72) Inventors: Adriano Mendo Mateo, Málaga (ES); Jose Outes Carnero, Torremolinos (ES); Juan Ramiro Moreno, Málaga (ES); Yak Ng Molina, Málaga (ES); Paulo Antonio Moreira Mijares, Málaga (ES); José María Ruiz Avilés, Málaga (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/027,512

(22) PCT Filed: Apr. 15, 2021

(86) PCT No.: PCT/IB2021/053138
§ 371 (c)(1),
(2) Date: Mar. 21, 2023

(87) PCT Pub. No.: WO2022/069954
PCT Pub. Date: Apr. 7, 2022

(65) Prior Publication Data
US 2023/0379225 A1 Nov. 23, 2023

(30) Foreign Application Priority Data
Oct. 1, 2020 (EP) ..................................... 20382874

(51) Int. Cl.
*H04L 41/16* (2022.01)
*H04L 41/046* (2022.01)

(52) U.S. Cl.
CPC ............ *H04L 41/16* (2013.01); *H04L 41/046* (2013.01)

(58) Field of Classification Search
None
See application file for complete search history.

(56) References Cited

U.S. PATENT DOCUMENTS

| 11,407,327 B1 * | 8/2022 | Kohn ...................... B60L 50/40 |
| 2002/0145981 A1 * | 10/2002 | Klinker ................. H04L 45/124 |
| | | 370/244 |

(Continued)

FOREIGN PATENT DOCUMENTS

| CN | 101873605 B | 3/2013 |
| WO | 2012072445 A1 | 6/2012 |

(Continued)

OTHER PUBLICATIONS

Buenestado, V. et al. "Self-tuning of Remote Electrical Tilts Based on Call Traces for Coverage and Capacity Optimization in LTE", IEEE Transactions on Vehicular Technology, vol. 66, No. 5, May 2017, pp. 4315-4326, IEEE.

(Continued)

*Primary Examiner* — Phuoc H Nguyen
(74) *Attorney, Agent, or Firm* — COATS & BENNETT, PLLC (57) ABSTRACT

A method and apparatus extend existing cell parameter optimization techniques so that they can be used in cases where different cells are controlled by the same control element. Particularly, a coordination agent (46) receives an intermediate control decision for controlling a control element (48) shared by the plurality of cells (14). The coordination agent consolidates each of the received intermediate decisions into a single consolidated control decision, and sends the consolidated control decision to the shared control element. The control element then controls a network ele- (Continued)

ment (26) in each of the cells using the same consolidated control decision.

19 Claims, 8 Drawing Sheets

(56) References Cited

U.S. PATENT DOCUMENTS

| | | | | |
|---|---|---|---|---|
| 2012/0207022 | A1* | 8/2012 | Grayson | H04W 24/08 370/235 |
| 2012/0287784 | A1* | 11/2012 | Shatzkamer | H04W 28/26 370/230.1 |
| 2013/0080607 | A1* | 3/2013 | Raleigh | G06Q 20/102 709/221 |
| 2013/0122885 | A1 | 5/2013 | Kojima | |
| 2013/0232267 | A1* | 9/2013 | Shatzkamer | H04L 67/566 709/226 |
| 2014/0040975 | A1* | 2/2014 | Raleigh | H04L 12/1435 726/1 |
| 2014/0219104 | A1* | 8/2014 | Senarath | H04L 47/83 370/238 |
| 2015/0112767 | A1* | 4/2015 | Shatzkamer | G06Q 30/0205 705/7.34 |
| 2015/0370232 | A1* | 12/2015 | Kohn | G06N 5/04 700/287 |
| 2017/0329289 | A1* | 11/2017 | Kohn | F24F 11/46 |
| 2019/0014488 | A1 | 1/2019 | Tan et al. | |
| 2019/0239238 | A1 | 8/2019 | Calabrese et al. | |
| 2019/0259097 | A1* | 8/2019 | Raleigh | H04M 15/68 |
| 2020/0145299 | A1* | 5/2020 | Do | H04L 41/0816 |

FOREIGN PATENT DOCUMENTS

| | | |
|---|---|---|
| WO | 2019139510 A1 | 7/2019 |
| WO | 2020119372 A1 | 6/2020 |
| WO | 2021190772 A1 | 9/2021 |
| WO | 2022042891 A1 | 3/2022 |

OTHER PUBLICATIONS

Razavi, R. et al., "Self-Optimization of Capacity and Coverage in LTE Networks Using a Fuzzy Reinforcement Learning Approach", 21st Annual IEEE International Symposium on Personal, Indoor and Mobile Radio Communications, Sep. 26-30, 2010, pp. 1865-1870, IEEE.

Guo, W. et al., "Spectral- and Energy-Efficient Antenna Tilting in a HetNet using Reinforcement Learning", 2013 IEEE Wirless Communications and Networking Conference (WCNC): MAC, Apr. 7-10, 2013, pp. 767-772, IEEE.

Sutton, R. et al., "Reinforcement Learning: An Introduction", Second edition, in progress, 2014, pp. 1-352, MIT Press.

Aumayr, E. et al., "Probabilistic Knowledge-Graph based Workflow Recommender for Network Management Automation", 2019 IEEE 20th International Symposium on "A World of Wireless, Mobile and Multimedia Networks" (WoWMoM), Jun. 10-12, 2019, pp. 1-7, IEEE.

Balevi, E. et al., "Online Antenna Tuning in Heterogeneous Cellular Networks With Deep Reinforcement Learning", IEEE Transactions on Cognitive Communications and Networking, vol. 5, No. 4, Dec. 2019, pp. 1113-1124, IEEE.

Mismar, F. et al., "A Framework for Automated Cellular Network Tuning with Reinforcement Learning", arXiv:1808.05140v5 [cs.NI], Jul. 18, 2019, pp. 1-32, arXiv.

Shah, T., "State Aware Principal Action Space Embedding for Centralized MARL", Autonomous Systems, Apr. 2021, pp. 1-8.

Lee, D. et al., "Optimization for Reinforcement Learning: From a single agent to cooperative agents", IEEE Signal Processing Magazine, May 2020, pp. 123-135, IEEE.

Wikipedia, "Reinforcement learning", pp. 1-13, retrieved on Feb. 15, 2023, retrieved from Internet: https://en.wikipedia.org/wiki/Reinforcement_learning.

Muñoz, P. et al., "Fuzzy Rule-Based Reinforcement Learning for Load Balancing Techniques in Enterprise LTE Femtocells", IEEE Transactions on Vehicular Technology, vol. 62, No. 5, Jun. 2013, pp. 1962-1973, IEEE.

Ramiro, J. et al., "Self-Organizing Networks: Self-Planning, Self-Optimization and Self-Healing For GSM, UMTS, and LTE", Dec. 2011, pp. 1-309, Wiley.

Han, J. et al. "Data Mining Concepts and Techniques", 3rd Edition, Jul. 2011, pp. 1-740, Elsevier.

Sun, F. et al., "Cell cluster-based dynamic TDD DL/UL reconfiguration in TD-LTE systems", IEEE Wireless Communications and Networking Conference (WCNC 2016)—Track 3—Mobile and Wireless Networks, Apr. 3-6, 2016. pp. 1-5, IEEE.

Cheng, M. et al., "Adaptive Adjustment of TDD Uplink-downlink Configuration based on Cluster Classification in Beyond LTE Heterogeneous Networks", Proceedings of the 2017 IEEE International Conference on Applied System Innovation (IEEE-ICASI 2017—Meen, Prior & Lam (Eds)), May 13-17, 2017, pp. 1312-1315, IEEE.

Pasquino, N. et al., "A comparative approach of unsupervised machine learning techniques for LTE network parameter clustering", 2020 IEEE International Instrumentation and Measurement Technology Conference (I2MTC), May 25-28, 2020, pp. 1-6, IEEE.

Ouyang, Y. et al., "Application Behaviors Driven Self-Organizing Network (SON) for 4G LTE Networks" IEEE Transactions on Network Science and Engineering, vol. 7 No. 1, Jan.-Mar. 2020, pp. 3-13, IEEE.

* cited by examiner

CELL MULTI-AGENT COORDINATION IN SHARED CONTROL ELEMENTS

TECHNICAL FIELD

The present disclosure relates generally to network optimization processes, and more particularly, to optimization processes that modify individual cell parameters that are shared among a plurality of cells in a communications network.

BACKGROUND

Cellular networks are generally very complex systems. Each cell has its own set of configurable parameters, which are typically optimized using automatic solutions. These solutions can be split in two types—Expert systems and Artificial Intelligence (AI) systems.

With Expert systems, a subject expert defines a set of rules to be applied. Some examples of such system are:
   Standard rules systems: These systems are typically comprised of if/then constructs and can be written in any programming language, such as DROOLS, for example. Such systems are used, for example, in the Rules Engine module of the Design and Optimization Platform (DOP); and
   Fuzzy systems: These systems comprise fuzzy rules that are based on fuzzy logic. For more information on these systems, the interested reader is directed to V. Buenestado, M. Toril, S. Luna-Ramírez, J. M. Ruiz-Avilés and A. Mendo, "Self-tuning of Remote Electrical Tilts Based on Call Traces for Coverage and Capacity Optimization in LTE," IEEE Transactions on Vehicular Technology, vol. 66, no. 5, pp. 4315-4326, May 2017.

With AI systems, a subject expert is not required because the optimization logic is automatically learned by the system using the data provided by the network. Some examples of AI system are:
   Recommender systems: These systems make parameter recommendations in one cell based on an analysis of what happens in other similar cells having different parameters. For more information on these systems, the interested reader is directed to Erik Aumayr, MingXue Wang and Anne-Marie Bosneag, "Probabilistic Knowledge-Graph based Workflow Recommender for Network Management Automation", 2019 IEEE 20th International Symposium on "A World of Wireless, Mobile and Multimedia Networks" (WoWMoM), June 2019.
   Reinforcement Learning (RL) agents: RL agents learn optimization policies by interacting (making changes/actions) with the network.

Recently, hardware capabilities have improved tremendously. As a result, conventional AI-based solutions, which typically consume large amounts of processing capabilities, have become popular. Particularly, AI-based solutions are more efficient than other solutions which propose the use of a single distributed RL agent to optimize cell parameters individually. However, even with their increased efficiency, conventional AI-based solutions can still be problematic.

Conventionally, agent functions, such as the ones discussed in the above-mentioned papers, are suitable for deployment in network cells to control network elements. Particularly, each agent function recommends a parameter change for its cell independently of the other agent functions in other cells. However, there are situations in which different cells can share a control element. This means that the parameter change for one of the cells will affect all the cells sharing the same control element. This could be, for instance, the case of an antenna element shared between cells. Particularly, modifying the Remote Electrical Tilt (RET) of the antenna element for one cell affects all the cells sharing the same antenna element.

Because the agent functions are intended to be executed independently per cell, they are not suitable for situations in which many cells share the same control element. Nevertheless, conventional solutions will (typically) consistently select the most appropriate value for one of the cells sharing the control element, and disregard the impact of that value on the other cells. For example, a conventionally-configured control element may consistently select a predefined network layer as a prioritized network layer. Another solution could be to train a system with a specific configuration of the network under consideration. In these cases, however, the number of possible scenarios is large. Therefore, training the system would be required in almost every single scenario.

SUMMARY

Embodiments of the present disclosure extend existing methods of optimizing cell parameters so that they can be used in cases where different cells are controlled by the same control element. More particularly, a network has a plurality of cells. Each cell has a corresponding cell agent that controls various aspects of a network element shared among the cells, such as the Remote Electrical Tilt (RET) of an antenna, for example. The shared network element is, in turn, controlled by a control element that is also shared by the plurality of cells.

To control the shared network element, each cell agent proposes a respective parameter change (referred to herein as an "intermediate control decision") independently of the other cell agents. By way of example, the intermediate control decisions may specify whether the network element should adjust/not adjust the tilt of the antenna. A new stage in the optimization process then consolidates the respective intermediate control decisions into a single, consolidated parameter change (referred to herein as a "consolidated control decision") and sends it to the control element. The control element then uses the composite control decision to control the network element.

Accordingly, one embodiment of the present disclosure provides a method for controlling a control element shared by a plurality of cells in a network. In this embodiment, the method is characterized by the steps of receiving, from each of a plurality of cell agents in the network, an intermediate control decision for controlling the control element, determining a consolidated control decision for controlling the control element based on the intermediate control decisions, and configuring the control element to perform an action that controls a network element in each of the plurality of cells based on the consolidated control decision.

Additionally, one embodiment of the present disclosure provides a corresponding network node for controlling a control element that is shared by a plurality of cells in a network. In this embodiment, the network node comprises communications interface circuitry and processing circuitry operatively coupled to the communications interface circuitry. The communications interface circuitry is configured to communicate with a plurality of cell agents in a communications network and a control element shared by a plurality of cells in the communications network. The network node is characterized by the processing circuitry, which is configured to receive, from each of the plurality of cell agents, an intermediate control decision for controlling the control element, determine a consolidated control decision for controlling the control element based on the intermediate control decisions, and configure the control element to perform an action that controls a network element in each of the plurality of cells based on the consolidated control decision.

The present disclosure also provides a non-transitory computer-readable medium storing computer program code thereon that, when executed by processing circuitry of a network node that controls a control element shared by a plurality of cells in a network, is characterized by causing the network node to receive, from each of a plurality of cell agents in the network, an intermediate control decision for controlling the control element, determine a consolidated control decision for controlling the control element based on the intermediate control decisions, and configure the control element to perform an action controlling a network element in each of the plurality of cells based on the consolidated control decision.

DETAILED DESCRIPTION

The present disclosure provides a method and corresponding apparatus for generating coordinated optimization parameter decisions. Such decisions (i.e., the "consolidated control decisions") are used for network cells that maintain common values for common parameters. In general, cells maintain such common values because the consolidated control decisions control aspects of a network element that is shared by those cells (e.g., the tilt of an antenna).

In more detail, aspects of the present disclosure extend existing cell parameter optimization techniques so that they can be used in situations where different network cells are controlled by the same control element. Particularly, a coordination agent, which is configured to control a control element shared by a plurality of network cells, receives intermediate control decisions from each of a plurality of cell agents associated with respective network cells. The coordination agent then consolidates each of the received intermediate control decisions into a single consolidated control decision, and sends the consolidated control decision to the shared control element. Upon receipt, the shared control element uses the consolidated control decision to control one or more aspects of a network element shared by each of the network cells.

In other words, aspects of the present disclosure consolidate the different control decisions provided by the different network cells into a single, consolidated control decision, and then uses that consolidated control decision to control the aspects of a shared network element. In this manner, the cell agents for each cell are exactly the same for all cells regardless of whether the cells do/do not share a control element. Moreover, the logic for consolidating the different control decisions is separated in an external coordination agent that is independent of all the other cell agents.

Referring now to the drawings, an exemplary embodiment of the disclosure will be described in the context of a 5G or NR wireless communication network. Those skilled in the art will appreciate, however, that the methods and apparatus herein described are not limited to use in 5G or NR networks. Rather, they may also be used in wireless communication networks where multiple beams within a single cell may be used for communication with wireless devices in the cell, as well as in a network using any Radio Access Network (RAN) technology including, but not limited to, WiFi, 2G, 3G, 4G, and beyond 5G.

Figure 1:
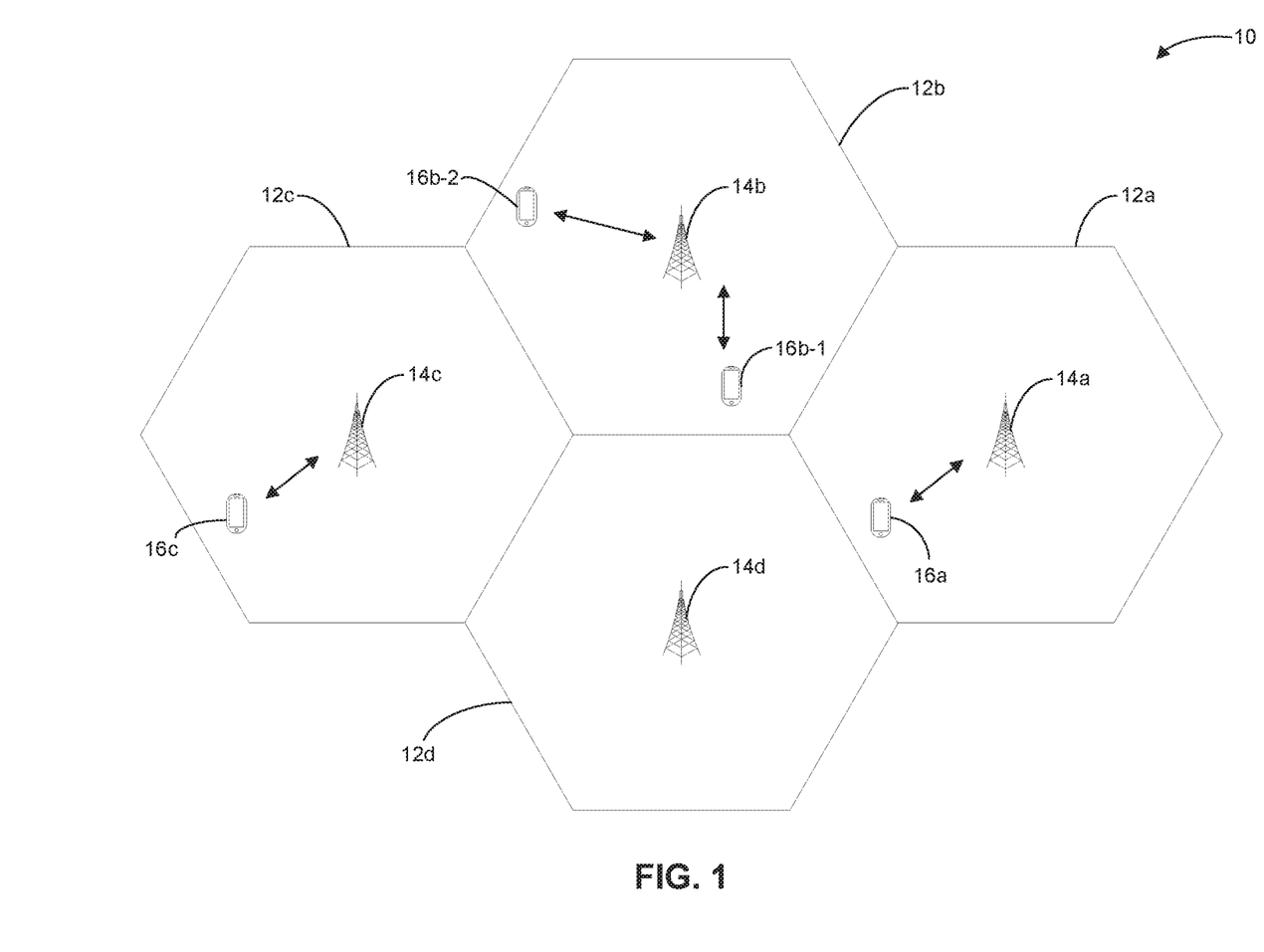
FIG. 1 illustrates an exemplary communication network according to an embodiment of the present disclosure.

FIG. 1 illustrates a wireless communication network 10 according to the NR standard currently being developed by Third Generation Partnership Project (3GPP). As seen in FIG. 1, wireless communication network 10 comprises one or more cells 12a, 12b, 12c, 12d (collectively, "cells 12"). Each cell 12 has one or more base stations (BSs) 14a, 14b, 14c, 14d (collectively, "BS 14") that serves one or more mobile devices such as User Equipment (UE) 16a, 16b-1, 16b-2, 16c (collectively, "UE 16"). The BSs 14 seen in FIG. 1 are also referred to as Evolved NodesBs (eNBs) and Fifth Generation (5G) NodeBs (gNBs) in 3GPP standards. Although only four cells 14 and four corresponding BSs 14 are shown in FIG. 1, those of ordinary skill in the art will readily appreciate that typical wireless communication networks 10 comprise more than four such cells 12 and more than four BSs 14.

The UEs 16 seen in FIG. 1 are mobile devices (e.g., smart phones) carried by the users. However, this is for illustrative purposes only. UEs 16 may comprise any type of equipment capable of communicating with BS 14 over a wireless communication channel. For example, the UEs 16 may comprise cellular telephones, laptop computers, notebook computers, tablets, machine-to-machine (M2M) devices (also known as machine type communication (MTC) devices), embedded devices, wireless sensors, or other types of wireless end user devices capable of communicating over wireless communication networks 10.

Figure 2:
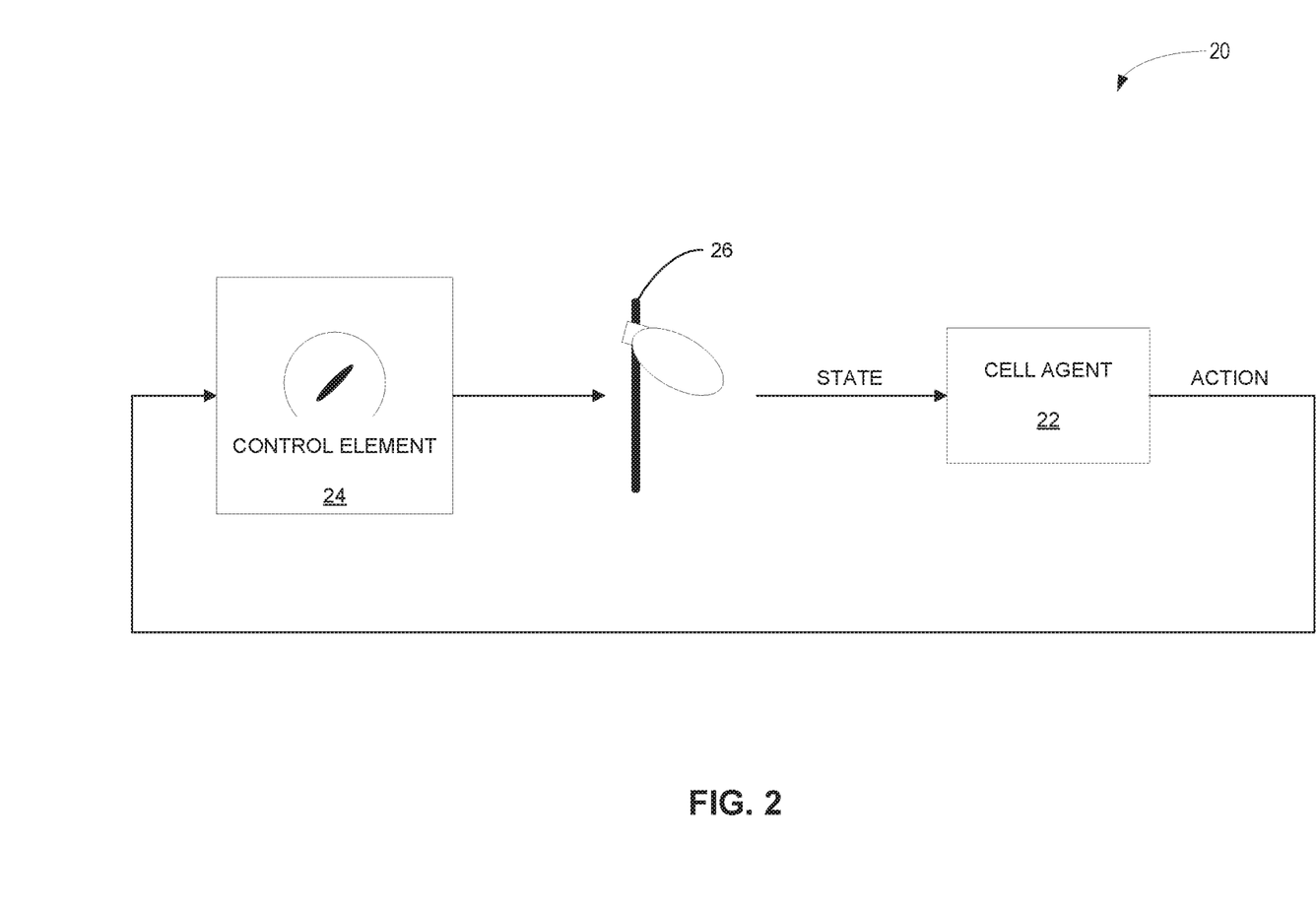
FIG. 2 is a functional block diagram illustrating a cell agent, a control element, and a network element according to embodiments of the present disclosure.

FIG. 2 is a functional block diagram illustrating components of a system 20 for controlling aspects of a shared network element according to one embodiment of the present disclosure. It should be noted that FIG. 2 illustrates the components as if they were used for a single cell. However, this is for clarity and ease of discussion only. As is seen later in more detail, the components of system 20 are used in situations where the same control element is shared by multiple network cells 14 to control a shared network element.

As seen in FIG. 2, system 20 comprises a cell agent 22, a control element 24, and a network element 26, such as a Remote Electrical Tilt (RET) antenna element. The cell agent 22 for a given network cell 14 reads information about the current status of the network cell 14 in which network element 26 is deployed. Such status information may include, but is not limited to, CM, PM, traces, and the like. The status information read by cell agent 22 is commonly referred to as "features," and form the "state" of the network cell 14. Using this "state" information, and implementing predetermined logic, cell agent 22 generates an "intermediate control decision." According to the present embodiments, the intermediate control decision defines a predefined action to be performed by control element 24 when controlling network element 26. The action normally takes three possible values: INCREASE, KEEP, and DECREASE. Upon receipt, control element 24 controls network element 26 according to the value of the action.

For example, consider a situation where network element 26 is an RET antenna element. In such cases, control element 24 may send a signal to network element 26 to INCREASE the tilt, DECREASE the tilt, or KEEP (i.e., maintain) the current tilt angle. The process is iterative, so once an intermediate control decision takes place, cell agent 22 reads new state information from network cell 14 and evaluates the information to generate a new intermediate control decision. The periodicity of this evaluation can be configured as needed or desired (e.g., hourly, daily, weekly, etc.).

Figure 3:
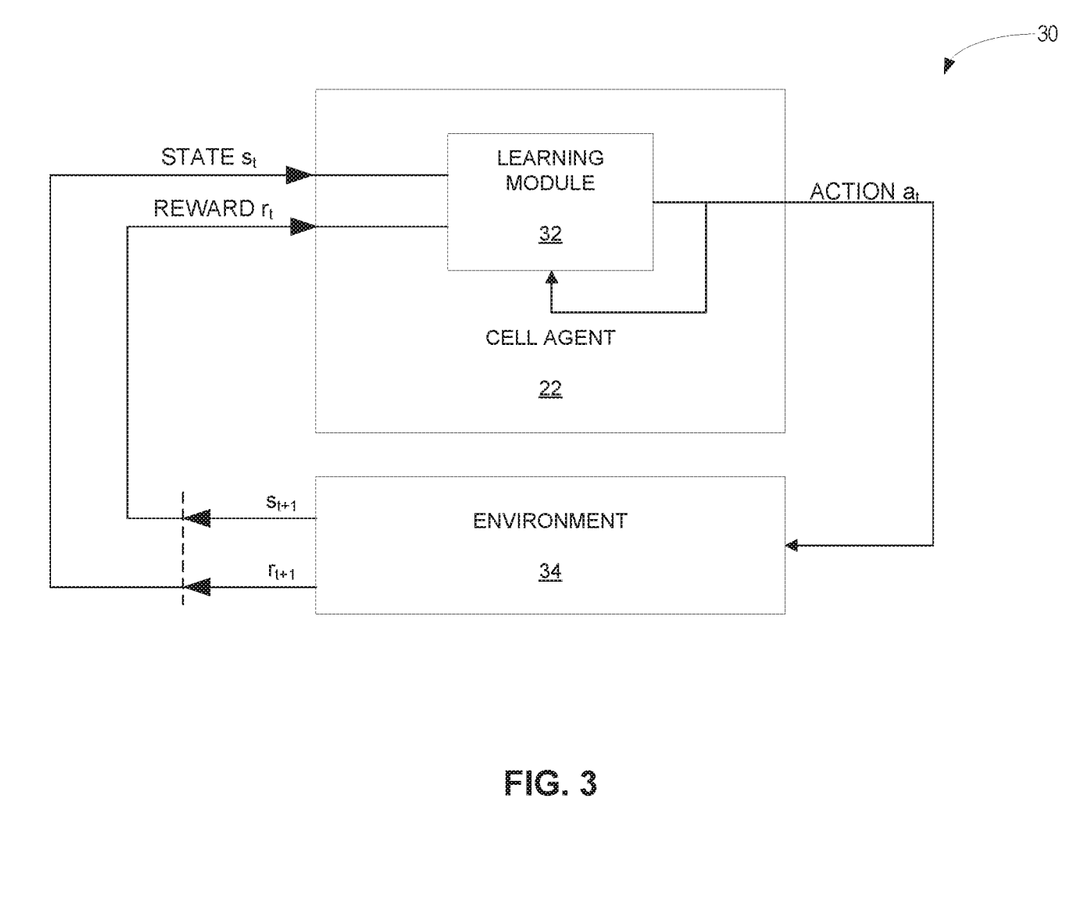
FIG. 3 is a functional block diagram illustrating a Reinforcement Learning (RL) cell agent according to an embodiment of the present disclosure.

Given the broad usage of AI techniques, cell agents 22 can be configured to implement their logic based on reinforcement learning (RL) techniques. One such cell agent 22 is illustrated in FIG. 3. As seen in this figure, cell agent 22 reads state information $s_t$ and reward information $r_t$ regarding a cell environment 34. A learning module 32 then uses that information to generate an action $a_t$. Action at is then output to control element 24 to control network element 26, as previously described, but is also fed back into the learning module 32 for automated training purposes. As previously described, this is an iterative process, and thus, cell agent 22 subsequently reads state information $s_{t+1}$ and reward information $r_{t+1}$ regarding cell environment 34 and outputs another action.

According to the present disclosure, an RL-based cell agent 22 is different than other standard cell agents 22. Particularly, as seen in FIG. 3, RL-based cell agents 22 consume both the state information $s_t$, as well as the reward information $r_t$, which is a performance measurement indicating a benefit produced by the previous action executed in the environment 34. Additionally, a corresponding tuple (i.e., state, action, reward) is input as feedback into learning module 32 and used by learning module 32 for automated training.

In this case, the "environment" is a network cell 14. However, those skilled in the art should readily appreciate that the present disclosure is not so limited. In some embodiments, the "environment" may comprise the network cell 14 and one or more neighboring cells 14.

As previously stated, there are situations in which a control element 24 is shared by more than one cell. Therefore, with conventional systems, any modification to a parameter changed by that control element 24 also affects other cells sharing that control element 24. The cell agent 22 of the present embodiments is configured to generate an intermediate control decision to control the parameter change. However, because the cells have different environments, the cell agents 22 could output different intermediate control decisions for cells that share the same control element 24. Therefore, embodiments of the present disclosure modify the current optimization architecture for the network.

One way is to create new cell agents 22 that can read the state information from more than one cell 14 at the same time, and based on that information, propose a single action—i.e. a single parameter value—to be used by a shared control element shared by those cells 14. However, it is possible that there will be different types of cell agents depending on the number of cells that share the control element. Therefore, this approach can make the training and optimization processes more complex and problematic.

Therefore, embodiments of the present disclosure provide a solution in which a single respective cell agent 22 is used for each cell 14, even in situations where those cells share the same control element. Additionally, however, the present embodiments also provide a new stage (i.e., a new agent function) configured to consolidate all the individual outputs produced by the individual cell agents 22 into a single consolidated action. In this manner, the cell agent 22 remains exactly the same for all cells 14 regardless of whether the cells 14 share a control element 26. Additionally, the logic used to generate the consolidated action is contained separately in an external and independent agent function. Such a system is illustrated as system 40 in FIG. 4.

Figure 4:
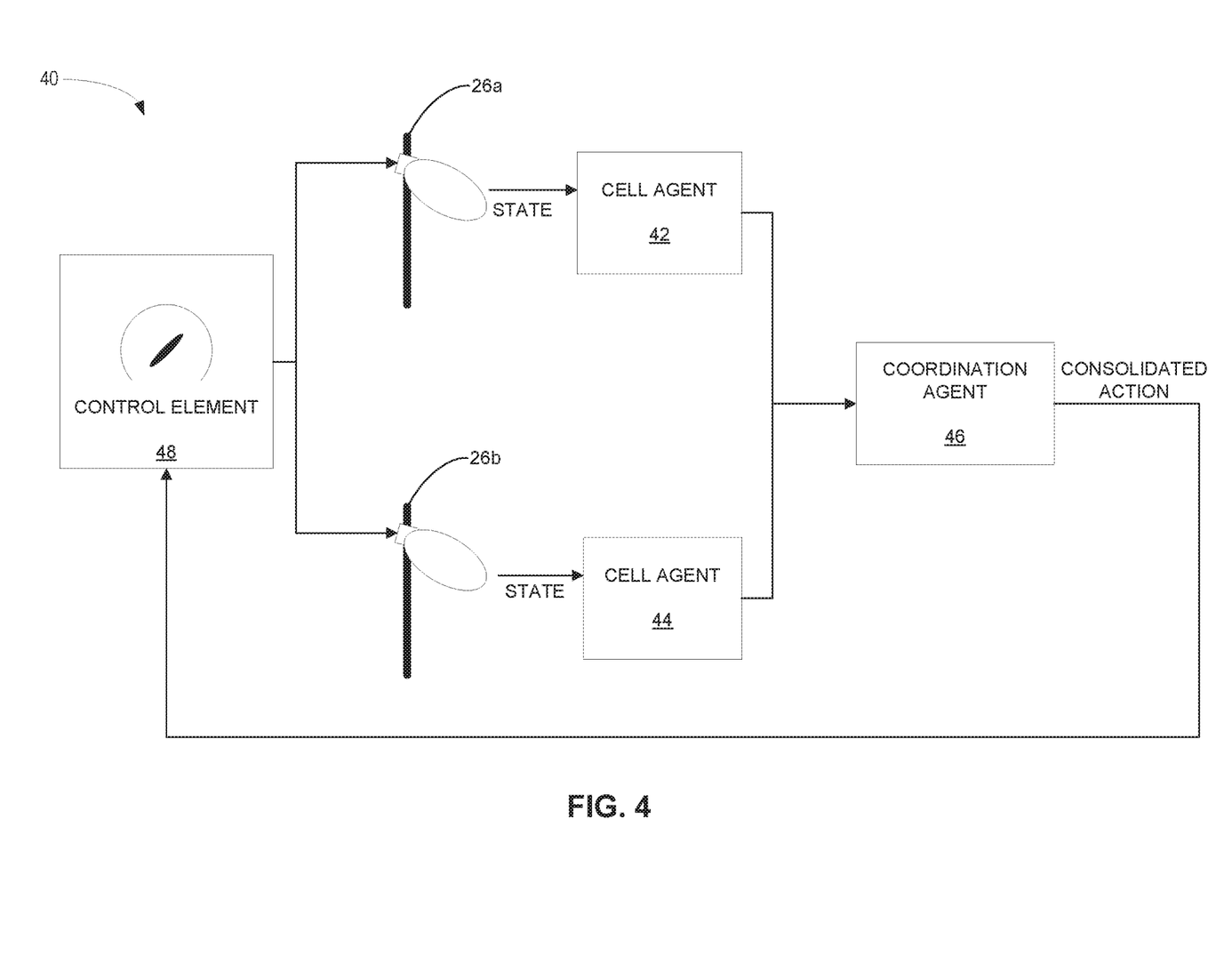
FIG. 4 is a functional block diagram illustrating a consolidation agent for consolidating the intermediate control decisions output by a plurality of cell agents, and a shared control element that controls the network elements in each cell according to the consolidated control decision according to one embodiment of the present disclosure.

As seen in FIG. 4, system 40 comprises a plurality of cell agents 42, 44—each associated with its own cell 14 having an RET antenna element 26a, 26b, a coordination agent 46, and a control agent 48 that is shared by the cells 14. Each cell agent 42, 44 reads the state information for its respective cell, as previously described, and generates a corresponding intermediate control decision, which as described above, is an action generated for each individual cell 14. Rather than sending the intermediate control decisions to the control element 48, however, the intermediate control decisions are used as input into coordination agent 46. Upon receipt, coordination agent 46 generates a consolidated control decision that is sent to the control element 48.

The coordination agent 46 utilizes coordination logic and takes the following as input:
Actions provided by the cell agents 22 of each individual cell 14. These are the "intermediate control decisions."
Additional RL features. These inputs are optional. For the case of cell-based RL agents using action-value functions, this might include an estimated Q-value associated with each output action.

The Q-value of an action defines an expected return given the current state of the cell environment and agent policy. More mathematically, given a states, an action a, and a policy π, the action-value of the pair (s, a) under a policy π is defined by:

$$Q^\pi(s,a)=E[R|s,a,\pi]$$

where the random variable R denotes a return, and is defined as being the sum of future discounted rewards. Expressed mathematically:

$$R = \sum_{t=0}^{\infty} \gamma^t r_t$$

where $r_t$ denotes a reward at step t; and $\gamma$ in [0,1] is a discount-rate. A discount-rate, as is known in the art, is a number between 0 and 1 (i.e., ($0 \leq \gamma \leq 1$)), and values rewards received earlier higher than those received later. This may be interpreted as, for example, reflecting the value of a "good start."

As stated above, there are typically three possible actions a output by a coordination agent—INCREASE, DECREASE, and KEEP. However, the coordination logic by which the coordination agent determines an action a can vary. For example, in some embodiments, coordination agent utilizes RL-based technology that outputs action-value functions. However, the present disclosure is not so limited. In other cases, RL is not needed and the coordination agent could output an action a based on technologies different from RL. For example, one such suitable technology is Heuristic.

Heuristic Methods

Coordination agents that utilize heuristic algorithms determine an action a based on one or more predetermined rules that are intended to produce the best control decision for all network cells that share the control element. Generally, the rules are defined using the best "a priori" knowledge about how the network should operate. FIG. 4 illustrates a system 40 comprising a coordination agent to determine the best consolidated control decision using a heuristic algorithm.

As seen in FIG. 4, system 40 comprises a plurality of cell agents 42, 44— each associated with its own cell, a coordination agent 46, and a control element 48 that is shared by all the cells. As above, the individual cell agents 42, 44 are communicatively connected to network elements 26a, 26b, respectively. The cell agents 42, 44 read the state information of their respective cells and output their individual control decisions to the coordination agent 46. Upon receipt of the individual control decisions from cell agents 42, 44, coordination agent 46 determines a consolidated control decision to send to shared control element 48. Control element 48 then controls an aspect of the network elements 26a, 26b in accordance with the received consolidated control decision.

Avoiding Contradictory Actions

The inputs to heuristic algorithm of FIG. 4 are, as stated above, the outputs of the individual cell agents 42, 44. Therefore, heuristic algorithms can be used with any cell agent regardless of whether they implement RL-based technologies that output an action-value function.

In general, this algorithm outputs a consolidated control decision of KEEP. However, it will output a control decision that is different from KEEP only in cases where the outputs of the different cell agents 42, 44 do not contradict each other (i.e., in this case, "contradict" means that one or more cell agents 42, 44 output INCREASE and one or more other cell agents 42, 44 output DECREASE). The algorithm can be described as follows:

| | |
|---|---|
| Inputs: | Actions proposed by the plurality of individual cell agents 42, 44. |
| Logic: | IF any single cell agent 42, 44 outputs INCREASE; AND at least one other single cell agent 42, 44 outputs DECREASE THEN output a consolidated action of KEEP; ELSE output the most frequent occurrence of the actions output by the single cell agent 42, 44. |

In cases where the number of INCREASE/DECREASE and KEEP actions output by cell agents 42, 44 are equal, the logic of the coordination agent 46 will depend on a configuration parameter referred to herein as "strategy." In particular:

| | |
|---|---|
| Logic: | IF the strategy is "CONSERVATIVE" THEN then output KEEP as the consolidated action; ELSE IF the strategy is "AGGRESSIVE" THEN output an action that is different from KEEP as the consolidated action (i.e., either INCREASE or DECREASE). |

The following table illustrates some examples for the lodic described above.

TABLE 1

| INTERMEDIATE CONTROL DECISIONS | CONSOLIDATED CONTROL DECISION |
|---|---|
| INCREASE INCREASE KEEP | KEEP |
| DECREASE INCREASE DECREASE KEEP | DECREASE |
| DECREASE KEEP | KEEP (Conservative Strategy) |
| INCREASE | INCREASE (Aggressive Strategy) |

Consolidated Control Decisions Using Maximum Q-Value

In another embodiment, the cell agents 42, 44 and the consolidated agent 46 utilize Quality values (Q-values) to determine their respective control decisions. More particularly, this embodiment uses a value-based RL-based algorithm to determine which action to take (i.e., the intermediate control decision by the cell agents 42, 44 and the consolidated control decision by coordination agent 46). The goal of the RL-based algorithm is to maximize the output value of a Q-function (i.e., the Q-value) thereby maximizing the total reward.

In this embodiment, the inputs to coordination agent 46, in accordance with an RL-based algorithm, are the independent action-values (i.e., Q-values) calculated by each of the single cell agents 42, 44 for all possible control decisions. Therefore, this embodiment is applicable for cell agents 42, 44 using RL-based techniques with action-value calculation. The fundamental goal of the algorithm in this embodiment is to select whichever action (i.e., the consolidated control decision) has the maximum Q-value among the Q-values output by all cell agents 42, 44. More particularly:

Inputs: The individual Q-values output by each individual cell agent 42, 44.

Logic: Select whichever action is associated with the maximum Q-value as the consolidated control decision. Mathematically, this may be described as follows:

$$\text{action} = \text{action} \in (\text{agent, action})$$

$$(\text{agent, action}) = \underset{\text{agent\_i, action\_j}}{\text{argmax}} (Q_{\text{agent\_i, action\_j}})$$

As an example, given the Q-values calculated by each of the single cell agents 42, 44 represented in Table 2 (see below), the output of the algorithm (i.e., the consolidated control decision) would be DECREASE. This is because the maximum Q-value is 10 returned by Agent 1) and corresponds to action Q-DECREASE.

TABLE 2

| AGENT | Q-DECREASE | Q-KEEP | Q-INCREASE |
|---|---|---|---|
| 1 | 10 | 3 | 5 |
| 2 | 2 | 5 | 6 |
| 3 | 1 | 4 | 8 |

Action with Maximum Sum of Q-Values

In this embodiment, the coordination agent 46 determines a consolidated control decision based on the sum of the Q-values output by each of the individual cell agents 42, 44. In more detail, the inputs into the coordination agent 46 are the independent action-values (Q-values) calculated by the independent cell agents 42, 44 for all possible control decisions. Therefore, this embodiment is applicable for cell agents 42, 44 implementing RL-based techniques with action-value calculation.

This embodiment provides a benefit over the previous embodiment, which relies on finding the maximum Q-value. Particularly, the problem with using the maximum Q-value to determine a consolidated control decision is that even though one intermediate control decision might be exceptionally good for one cell agent (e.g., cell agent 42), that same decision, when implemented by the control element 48, may be very poor for one or more other cell agents (e.g., cell agent 44). The algorithm of this embodiment, however, solves this issue.

Inputs: The individual Q-values output by each individual cell agent 42, 44.

Logic: For each intermediate control decision (INCREASE, DECREASE, KEEP):
  sum the Q-values output by all the cell agents 42, 44; and
  select whichever action is associated with the maximum Q-value as the consolidated control decision.

This is, mathematically $$\text{consolidated control decision} = \underset{\text{action\_j}}{\text{argmax}} \sum_{i=1}^{\text{num\_agents}} Q_{\text{agent\_i, action\_j}}$$

As an example, given the Q-values calculated by single cell agents 42, 44 represented in Table 2:
  the sum of the cell agents outputting a Q-value associated with DECREASE is 13
  the sum of the cell agents outputting a Q-value associated with KEEP is 12
  the sum of the cell agents outputting a Q-value associated with INCREASE is 19. Therefore, in this embodiment, the coordination agent 46 would output INCREASE because the maximum of the sum of Q-values (i.e. 19) is associated with INCREASE.

Reinforcement Learning (RL) Methods

In addition to the heuristic embodiments discussed above, the present disclosure also provides embodiments that determine a consolidated control decision using RL-based techniques. In this embodiment, the action-values (i.e., the Q-values) calculated and output by all the single cell agents for all the possible actions are input into the coordination agent. Therefore, this method is applicable to cell agents using RL with action-value calculation.

Additionally, in this embodiment, there are no heuristic rules defined over the Q-values output by the single cell agents. Rather, the logic used to determine the best consolidated control decision is derived automatically in the process of training a second stage of a cell agent using RL. This is shown in FIG. 5.

Figure 5:
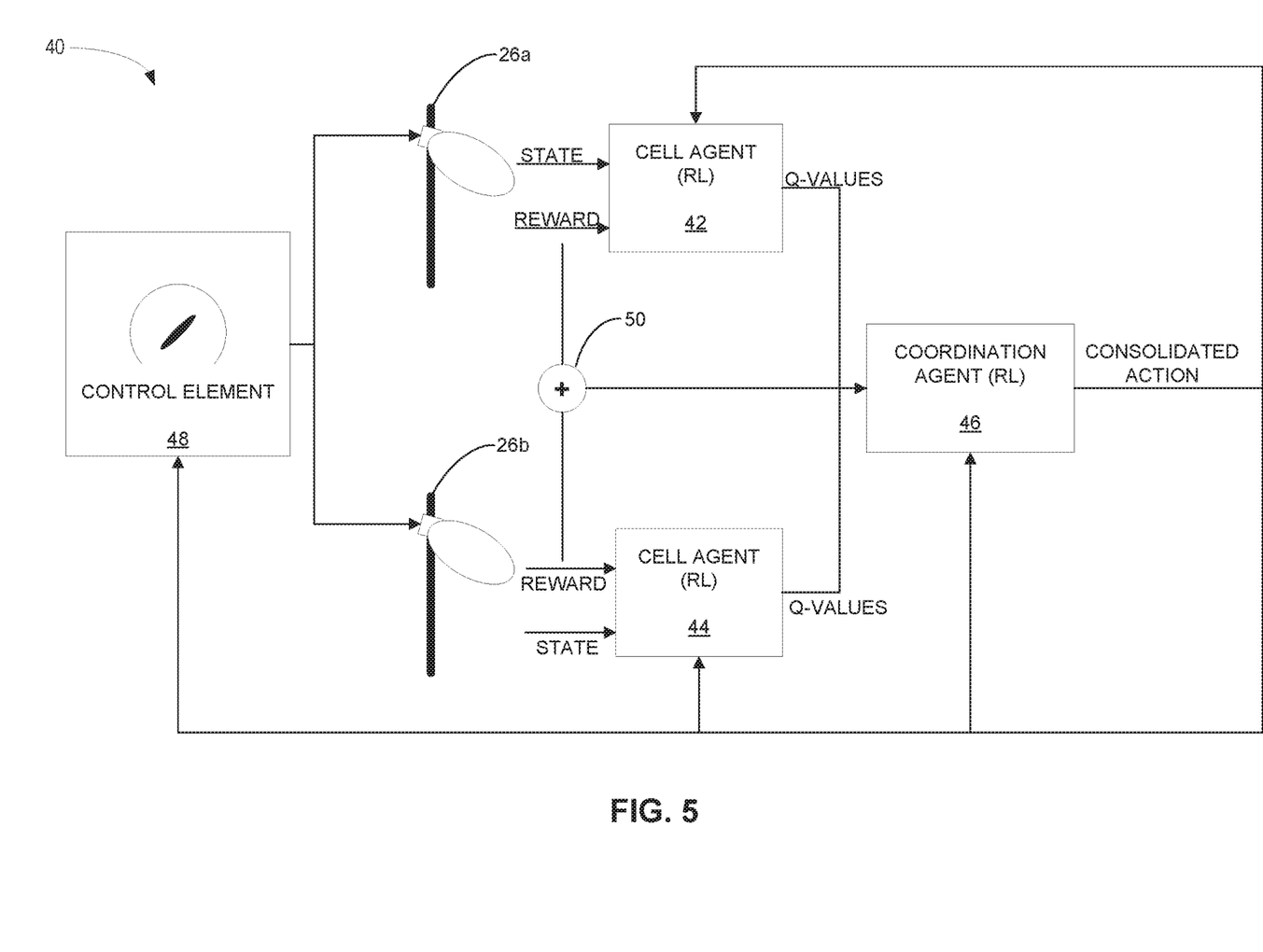
FIG. 5 is a functional block diagram illustrating a consolidation agent for consolidating the intermediate control decisions output by a plurality of RL cell agents, and a shared control element that controls the network elements in each cell according to the consolidated control decision according to one embodiment of the present disclosure.

As seen in FIG. 5, system 40 comprises all the same components as in FIG. 4. However, in this embodiment, the cell agents 42, 44 also read reward information regarding their respective cells. This reward information, which as stated previously is a performance measurement indicating a benefit realized in the cell due to the previous consolidated control decision, is also summed by a summing function 50 and sent to coordination agent 46 along with the Q-values of the cell agents 42, 44. Further, in addition to being sent to the control element 48, the consolidated control decision is input to the cell agents 42, 44 and the coordination agent 46 as feedback information.

Figure 6:
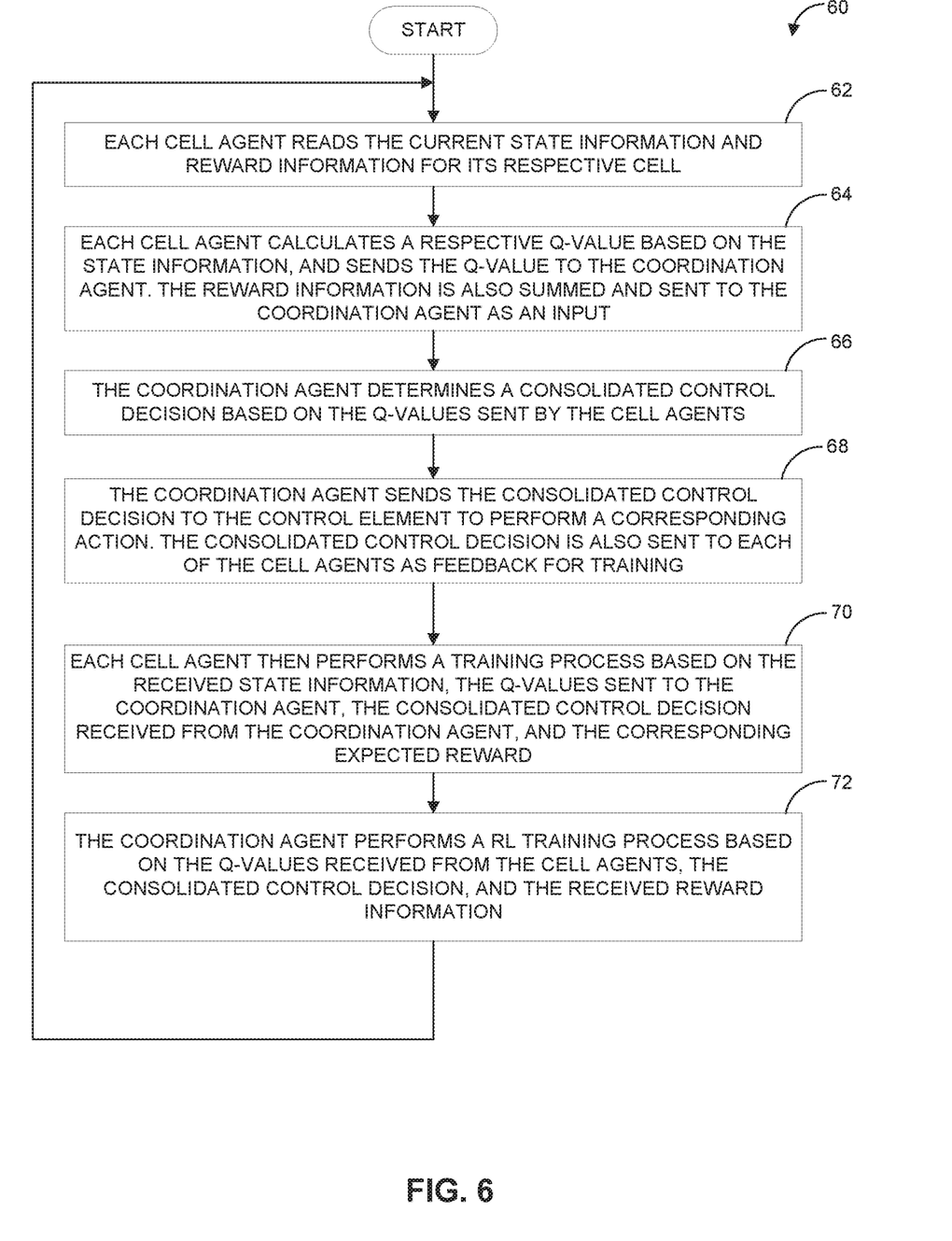
FIG. 6 is a flow diagram illustrating a method for generating a consolidated control decision according to one embodiment of the present disclosure.

FIG. 6 is a flow diagram illustrating a method implemented by system 40 of FIG. 5. As seen in FIG. 6, method 60 is an iterative method.

Method 60 begins with each of the plurality of cell agents 42, 44 reading the current state of their respective cells (box 62). Reading the current state includes, but is not limited to, the current state information and the reward information for the cell.

The cell agents 42, 44 are not modified to use RL-based techniques to produce action-values. Instead, each cell agent 42, 44 comprises logic learned over time that maps the current state of its cell to the various Q-values for all possible actions. Based on this logic and on the current state information, each cell agent 42, 44 calculates its own Q-value and sends it to coordination agent 46 (box 64).

The coordination agent 46 also utilizes RL-based techniques. More specifically, the coordination agent 46 comprises logic learned over time that maps the Q-values received from the cell agents to the consolidated control decision it will output. Using this logic and the current Q-values from the cell agents, the coordination agent 46 selects the appropriate consolidated control decision (box 66).

The coordination agent 46 then sends the consolidated control decision to control element 48 to perform the desired action (i.e., KEEP, INCREASE, DECREASE) in all the affected cells. Additionally, coordination agent 46 sends the consolidated control decision to each of the single cell agents 42, 44, as well as to itself, as feedback for further training (box 68).

Each cell agent 46 then performs an RL training process based on the received state information, the Q-values sent to the coordination agent, the consolidated control decision provided by the coordination agent, and a new, corresponding individual reward read for each cell (box 70).

The coordination agent 46 also performs an RL training process based on the Q-values received from the cell agents 42, 44, the consolidated control decision, and the received reward information received from summing function 50 (box 72).

It should be noted that the training process performed in box 70 is executed using the consolidated control decision output by the coordination agent—not the individual control decision calculated and output by the cell agents 42, 44. In this manner, each cell agent 42, 44 is trained in what is referred to as the "offline" mode, where a training policy for a single cell agent is different from the exploration policy of the coordination agent. Therefore, in a single RL-based cell agent, such as cell agents 42, 44, RL algorithms that support the "offline" mode are required, and are based on action-value functions, such as those utilized in Q-Learning.

Additionally, in this embodiment, there is only one coordination agent 46 regardless of the number of cell agents 42, 44 that output the intermediate control decisions. As such, the coordination agent 46 should have a fixed number of inputs. There are two options in order to achieve this:

A first option is to fix the maximum number of single cell agents and take the Q-values from those agents as inputs. Q-values coming from all other cell agents will be afforded a constant low Q-value.

A second option is to configure the cell agents to calculate aggregation metrics and use those values as inputs rather than the Q-values. Some example aggregations include, per action (i.e., per INCREASE, DECREASE, and KEEP), a value indicating one of:
The maximum value of the aggregated metrics;
The minimum value of the aggregated metrics;
The sum of the aggregated metrics;
The mean of the aggregated metrics;
The median of the aggregated metrics; and
The standard deviation of the aggregated metrics.

Further, this embodiment of the present disclosure does not require the RL algorithm used in the coordination agent 46 to be based on an action-value function. This is because the Q-values output by the coordination agent 46 are not used anywhere else. Thus, there are no restrictions constraining the RL algorithm being used by the coordination agent 46.

Figure 7:
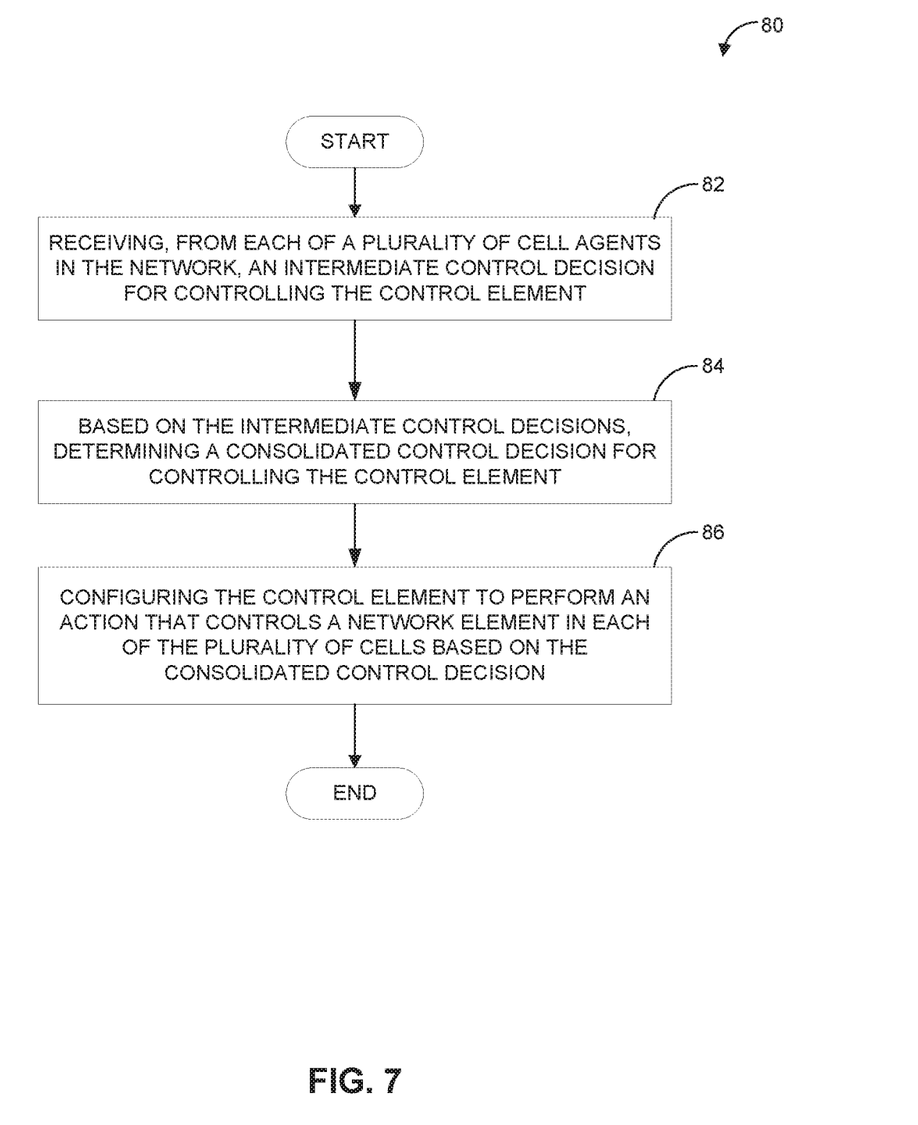
FIG. 7 is a flow diagram illustrating a method for generating a consolidated control decision for configuring a control element shared by a plurality of cells according to one embodiment of the present disclosure.

FIG. 7 is a flow diagram illustrating a method 80 for determining a consolidated control decision according to one embodiment of the present disclosure. As seen in FIG. 7, method 80 begins with coordination agent 46 receiving, from each of a plurality of cell agents 42, 44, an intermediate control decision for controlling a control element 48 (box 82). As stated above, each intermediate control decision output by each independent cell agent may, for example, be a value associated with an action to be performed by the control agent 48 (e.g., INCREASE, DECREASE, KEEP), or may be a Q-value that maps to one of those corresponding actions. Regardless, based on the received intermediate control decisions, and on internal logic, coordination agent 48 determines a consolidated control decision for controlling the control element 48 (box 84). Coordination agent 46 then configures the control element 48 to perform an action (e.g., INCREASE, DECREASE, KEEP) that controls a network element 26a, 26b, in each of the plurality of cells 14 based on the consolidated control decision (box 86). To accomplish this, coordination agent 46 sends the consolidated control decision to the control element 48. In some embodiments, coordination agent 46 also provides the consolidated control decision to each of the cell agents 42, 46, as well as to itself, where it is used as feedback for RL.

In some embodiments, as previously described, each of the intermediate control decisions is a parameter value indicating one of INCREASE, DECREASE, and KEEP.

In some embodiments, the consolidated control decision is set to KEEP when the intermediate control decision received from a first cell agent (e.g., cell agent 42) is INCREASE, and the intermediate control decision received from a second cell agent (e.g., cell agent 44) is DECREASE at the same time.

In some embodiments, the consolidated control decision is set to be the most frequent one of the intermediate control decisions received from the plurality of cell agents.

In some embodiments, the consolidated control decision is set based on a predetermined policy and a number and type of the intermediate control decisions.

In some embodiments, when a number of intermediate control decisions having a value of INCREASE is equal to the number of intermediate control decisions having a value of KEEP, the consolidated control decision is set to KEEP according to a first predetermined policy, or to INCREASE according to a second predetermined policy that is different from the first predetermined policy.

In some embodiments, when a number of intermediate control decisions having a value of DECREASE is equal to the number of intermediate control decisions having a value of KEEP, the consolidated control decision is set to KEEP according to a first predetermined policy, or DECREASE according to a second predetermined policy that is different from the first predetermined policy.

In some embodiments, each of the intermediate control decisions is a Quality value (Q-value) indicating one of INCREASE, DECREASE, and KEEP.

In some embodiments, the consolidated control decision is set to a maximum one of the Q-values.

In some embodiments, the method 80 further comprises summing the Q-values indicating INCREASE to a first summed Q-value, summing the Q-values indicating DECREASE to a second summed Q-value, and summing the Q-values indicating KEEP to a third summed Q-value. The consolidated control decision is then set to a maximum of the first, second, and third summed values.

In some embodiments, each Q-value is calculated based on one or more of:
a current state of a cell associated with the cell agent from which the Q-value was received;
a current state(s) of cell(s) associated with other cell agent(s); and
a reward value for the cell associated with the cell agent from which the Q-value was received. In these embodiments, the reward value is a performance measurement indicating a change in the cell since the control element was last configured to perform a previous action (e.g., INCREASE, DECREASE, and KEEP).

In some embodiments, coordination agent also receives a reward value from each of the plurality of cell agents. In these cases, the consolidated control decision is further determined based, at least in part, on each of the reward values.

In some embodiments, the consolidated control decision is further determined based on a sum of the reward values received from the plurality of cell agents.

In some embodiments, each Q-value received from the cell agents is mapped to a corresponding consolidated control decision.

In some embodiments, the consolidated control decision is provided as feedback to each of the plurality of cell agents that reported the individual intermediate control decisions, as well as to the coordination agent that determined the consolidated control decision.

In some embodiments, configuring the control element to perform the action (e.g., INCREASE, DECREASE, or KEEP) comprises sending the consolidated control decision to the control element.

In some embodiments, the consolidated control decision is determined based on reinforcement learning (RL).

An apparatus can perform any of the methods herein described by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 8:
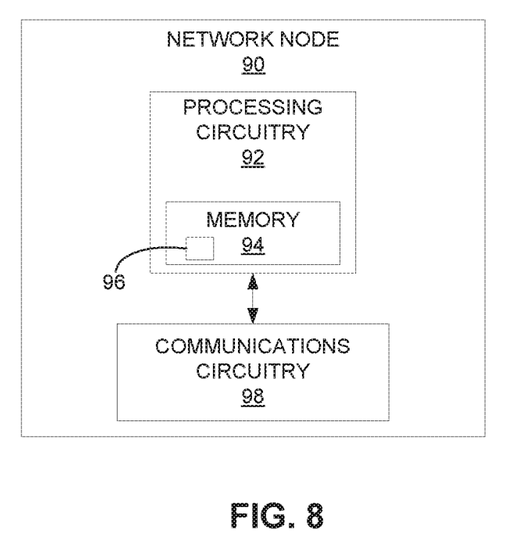
FIG. 8 is a block diagram illustrating some components of a network node configured according to one embodiment of the present disclosure.

FIG. 8 is a block diagram illustrating some components of a network node configured according to one embodiment of the present disclosure. The network node 90 comprises processing circuitry 92, memory circuitry 94, and communications circuitry 98. In addition, memory circuitry 96 stores a computer program 96 that, when executed by processing circuitry 92, configures network node 90 to implement the methods herein described.

In more detail, the processing circuitry 92 controls the overall operation of network node 90 and processes the data and information it receives from other sends and receives to/from other nodes. Such processing includes, but is not limited to, receiving respective intermediate control decisions from a plurality of cell agents, determining a consolidated control decision to send to a control element based on internal logic and each of the received intermediate control decisions, and sending the consolidated control decision to a shared control element for controlling a shared network element. In this regard, the processing circuitry 92 may comprise one or more microprocessors, hardware, firmware, or a combination thereof.

The memory circuitry 94 comprises both volatile and non-volatile memory for storing computer program code and data needed by the processing circuitry 92 for operation. Memory circuitry 94 may comprise any tangible, non-transitory computer-readable storage medium for storing data including electronic, magnetic, optical, electromagnetic, or semiconductor data storage. As stated above, memory circuitry 94 stores a computer program 96 comprising executable instructions that configure the processing circuitry 92 to implement the methods herein described. A computer program 96 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 96 for configuring the processing circuitry 92 as herein described may be stored in a removable memory, such as a portable compact disc, portable digital video disc, or other removable media. The computer program 96 may also be embodied in a carrier such as an electronic signal, optical signal, radio signal, or computer readable storage medium.

The communication circuitry 98 communicatively connects network node 90 to one or more other nodes via a communications network, as is known in the art. In some embodiments, for example, communication circuitry 98 communicatively connects network node 90 to a plurality of cell agents (i.e., each cell agent in a respective network cell 14), and a control element that is shared by each of the network cells. As such, communications circuitry may comprise, for example, an ETHERNET card or other circuitry configured to communicate wirelessly with the cell agents and the control element.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 9:
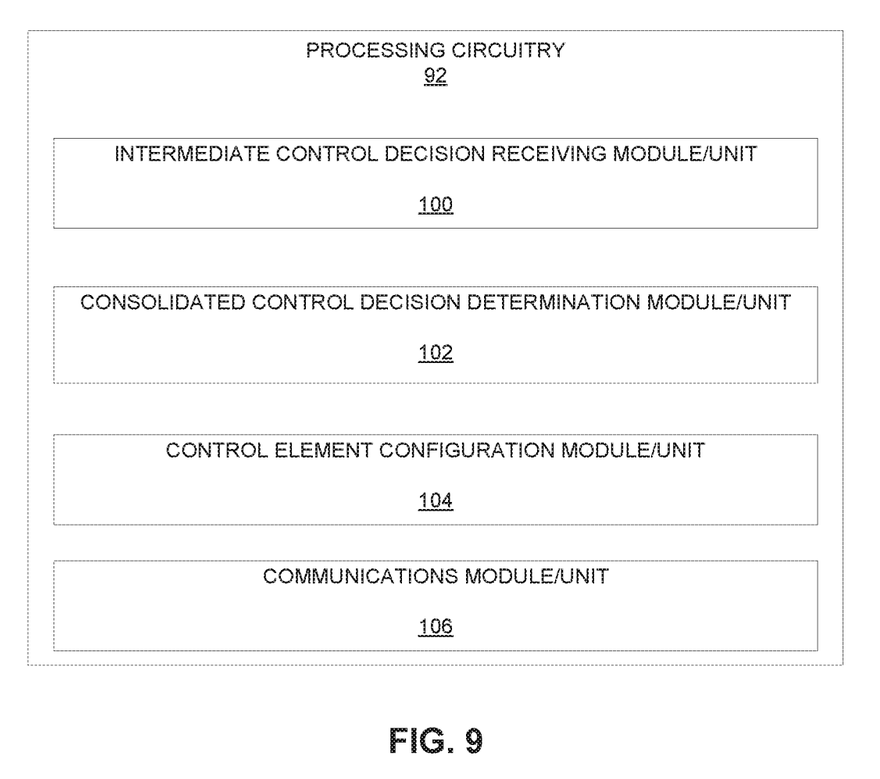
FIG. 9 is a functional block diagram illustrating some functions executed by processing circuitry of a network node according to one embodiment of the present disclosure.

FIG. 9 is a functional block diagram illustrating some functions of computer program 96 executed by processing circuitry of a network node according to one embodiment of the present disclosure. As seen in FIG. 9, computer program 96 comprises an intermediate control decision receiving module/unit 100, a consolidated control decision determination module/unit 102, a control element configuration module/unit 104, and a communications module/unit 106.

When computer program 96 is executed by processing circuitry 92, the intermediate control decision receiving module/unit 100 configures network node 90 to receive, from each of a plurality of cell agents, respective intermediate control decisions determined by those cell agents, as previously described. The consolidated control decision determination module/unit 102 configures network node 90 to determine a consolidated control decision based on the received intermediate control decisions, and on internal logic, as previously described. The control element configuration module/unit 104 configures network node 90 to receive the consolidated control decision from the consolidation control decision determination module/unit 102, and control a shared network element, such as an RET antenna element, for example, according to consolidated control decision, as previously described. The communications module/unit 106 configures network node 90 to send and receive other information and data with the cell agents, as previously described. For example, communications module/unit 106 configures network node 90 to receive reward information from the cell agents (e.g., values representing the performance of a cell after a previous action such as INCREASE, DECREASE, and KEEP), and to send the consolidated control decision to itself, and to each of the control agents, as feedback information, as previously described.

Embodiments further include a carrier containing such a computer program 96. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium. The present embodiments provide benefits and advantages that conventional systems and method do not provide. For example:

- The present embodiments solve the problem of optimizing a common parameter for multiple cells by selecting the most appropriate value to maximize overall performance of multiple cells. This is unlike conventional solutions, which consistently select a most appropriate value for one of the cells. That is, conventional solutions disregard the impact changing a shared parameter has on the other cells sharing the parameter (e.g., sharing the antenna tilt but operating in a different frequency);
- The present embodiments also negate the need to change the existing cell agent used in a cell that shares a control element being optimized;
- The present embodiments negate the need to consider separate cell agents that collect cell features in cases where two or more cells should be optimized together due to a shared control element;
- With the present embodiments, the logic to consolidate or coordinate the intermediate control decisions output by the individual cell agents is completely separated. Further, the logic does not use cell features, but rather, uses only those cell features coming directly from the cell agents;
- The present embodiments also simplify the training process because only one type of cell agent exists (i.e. a single cell agent) that treats with cell features. The coordination agent only uses a subset of the features output by the single cell agents. Thus, it is unnecessary to re-train existing cell agents that were already trained before adopting the present embodiments.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method for controlling a control element shared by a plurality of cells in a network, the method comprising:
   receiving, from each of a plurality of cell agents in the network, an intermediate control decision for controlling the control element;
   based on the intermediate control decisions, determining a consolidated control decision for controlling the control element, wherein the intermediate control decisions from each of the plurality of cell agents are consolidated into a single consolidated control decision; and
   configuring the control element to perform an action that controls a network element in each of the plurality of cells based on the consolidated control decision;
   wherein the consolidated control decision is set to KEEP, INCREASE or DECREASE depending on the intermediate control decisions of the plurality of cell agents being set to KEEP, INCREASE, OR DECREASE; and
   wherein the consolidated control decision controls the tilt of an antenna.

2. The method of claim 1 wherein each of the intermediate control decisions is a parameter value indicating one of INCREASE, DECREASE, and KEEP.

3. The method of claim 1 wherein the consolidated control decision is set to KEEP when the intermediate control decision received from a first cell agent is INCREASE, and the intermediate control decision received from a second cell agent is DECREASE at a same time.

4. The method of claim 1 wherein the consolidated control decision is set to a most frequent one of the intermediate control decisions received from the plurality of cell agents.

5. The method of claim 1 wherein the consolidated control decision is set based on a predetermined policy and a number and type of the intermediate control decisions.

6. The method of claim 1 wherein when a number of intermediate control decisions having a value of INCREASE is equal to the number of intermediate control decisions having a value of KEEP, the consolidated control decision is set to:
   KEEP according to a first predetermined policy; or
   INCREASE according to a second predetermined policy that is different from the first predetermined policy.

7. The method of claim 1 wherein when a number of intermediate control decisions having a value of DECREASE is equal to the number of intermediate control decisions having a value of KEEP, the consolidated control decision is set to:
   KEEP according to a first predetermined policy; or
   DECREASE according to a second predetermined policy that is different from the first predetermined policy.

8. The method of claim 1 wherein each of the intermediate control decisions is a Quality value (Q-value) indicating the one of INCREASE, DECREASE, and KEEP.

9. The method of claim 8 wherein the consolidated control decision is set to a maximum one of the Q-values.

10. The method of claim 8 further comprising:
    summing the Q-values indicating INCREASE to a first summed Q-value;
    summing the Q-values indicating DECREASE to a second summed Q-value;
    summing the Q-values indicating KEEP to a third summed Q-value; and
    wherein the consolidated control decision is set to a maximum of the first, second, and third summed values.

11. The method of claim 8 wherein each Q-value is calculated based on one or both of:
    a current state of a cell associated with the cell agent from which the Q-value was received; and
    a reward value for the cell associated with the cell agent from which the Q-value was received, wherein the reward value is a performance measurement indicating a change in the cell since the control element was last configured to perform a previous action.

12. The method of claim 11 further comprising receiving a reward value from each of the plurality of cell agents, and wherein the consolidated control decision is further determined based on each of the reward values.

13. The method of claim 12 wherein the consolidated control decision is further determined based on a sum of the reward values received from the plurality of cell agents.

14. The method of claim 12 wherein each Q-value is mapped to a corresponding consolidated control decision.

15. The method of claim 1 further comprising feeding back the consolidated control decision to a coordination agent configured to determine the consolidated control decision and to each of the plurality of cell agents.

16. The method of claim 1 wherein configuring the control element to perform the action comprises sending the consolidated control decision to the control element.

17. The method of claim 1 wherein the consolidated control decision is determined based on reinforcement learning (RL).

18. A network node for controlling a control element that is shared by a plurality of cells in a communications network, the network node comprising:
    communications interface circuitry configured to communicate with:
       a plurality of cell agents in the communications network; and
       a control element shared by a plurality of cells in the communications network; and processing circuitry operatively coupled to the communications interface circuitry and configured to:
          receive, from each of the plurality of cell agents, an intermediate control decision for controlling the control element;
          based on the intermediate control decisions, determine a consolidated control decision for controlling the control element, wherein the intermediate control decisions from each of the plurality of cell agents are consolidated into a single consolidated control decision; and
          configure the control element to perform an action that controls a network element in each of the plurality of cells based on the consolidated control decision;
       wherein the consolidated control decision is set to KEEP, INCREASE or DECREASE depending on the intermediate control decisions of the plurality of cell agents being set to KEEP, INCREASE, OR DECREASE; and
    wherein the consolidated control decision controls the tilt of an antenna.

19. A non-transitory computer-readable medium storing computer program code thereon that, when executed by processing circuitry of a network node that controls a control element shared by a plurality of cells in a network, causes the network node to:
    receive, from each of a plurality of cell agents in the network, an intermediate control decision for controlling the control element;
    based on the intermediate control decisions, determine a consolidated control decision for controlling the control element, wherein the intermediate control decisions from each of the plurality of cell agents are consolidated into a single consolidated control decision; and
    configure the control element to perform an action controlling a network element in each of the plurality of cells based on the consolidated control decision;
    wherein the consolidated control decision is set to KEEP, INCREASE or DECREASE depending on the intermediate control decisions of the plurality of cell agents being set to KEEP, INCREASE, OR DECREASE; and
    wherein the consolidated control decision controls the tilt of an antenna.

* * * * *